United States Patent
Manternach et al.

(10) Patent No.: US 10,717,475 B2
(45) Date of Patent: Jul. 21, 2020

(54) OPERATOR STATION SUSPENSION ISOLATION SYSTEM

(71) Applicant: Deere & Company, Moline, IL (US)

(72) Inventors: Byron N. Manternach, Dunkerton, IA (US); Wen Tsung Lin, Waterloo, IA (US); Donald E. Young, Cedar Falls, IA (US); Aaron Booms, Denver, IA (US); William K. Rule, Cedar Falls, IA (US); Jade Bender, Waterloo, IA (US); Kiran Patil, Pune (IN); Anthony DeSalvo, Waterloo, IA (US); Ryan Pecinovsky, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 51 days.

(21) Appl. No.: 16/207,325

(22) Filed: Dec. 3, 2018

(65) Prior Publication Data
US 2020/0172176 A1 Jun. 4, 2020

(51) Int. Cl.
*B62D 33/06* (2006.01)
*B62D 33/10* (2006.01)
*E02F 9/16* (2006.01)

(52) U.S. Cl.
CPC ..... *B62D 33/0617* (2013.01); *B62D 33/0604* (2013.01); *B62D 33/10* (2013.01); *E02F 9/16* (2013.01); *B60G 2204/162* (2013.01); *E01C 2301/30* (2013.01)

(58) Field of Classification Search
CPC B62D 33/0617; B62D 33/0604; B62D 33/10; E02F 9/16

USPC .................................................. 296/190.07
See application file for complete search history.

(56) References Cited

U.S. PATENT DOCUMENTS

| 6,030,017 A * | 2/2000 | Stojkovic | B60G 99/004 296/35.1 |
| 2006/0202515 A1* | 9/2006 | Dickson | B60G 99/002 296/190.07 |
| 2010/0301634 A1* | 12/2010 | Ansorge | B60R 21/13 296/190.03 |

(Continued)

FOREIGN PATENT DOCUMENTS

EP 1645494 A2 12/2006

*Primary Examiner* — Jason S Morrow
(74) *Attorney, Agent, or Firm* — Taft Stettinius & Hollister LLP; Stephen F. Rost (57) ABSTRACT

An operator station suspension system including isolators, a butterfly crossbar and station connection locations located on the butterfly crossbar. The butterfly crossbar includes a central crossbar that extends laterally with forward extending arms rigidly connected at the left and right ends, and rearward extending arms rigidly connected at the left and right ends of the central crossbar. The butterfly crossbar couples to the operator station at the station connection locations with one of the isolators located between the butterfly crossbar and the operator station at each of the station connection locations to reduce noise and vibration. Each connection location can have a connection post, and the isolators can be ring-shaped to fit over the connection posts. The suspension system can also include shock dampers for vertical movement, control linkages for pitch motion, and/or stabilizer linkages for roll motion of the subframe structure relative to the chassis.

20 Claims, 7 Drawing Sheets

(56) References Cited

U.S. PATENT DOCUMENTS

| | | | |
|---|---|---|---|
| 2013/0341966 A1* | 12/2013 | Milburn | B62D 33/0604 |
| | | | 296/190.07 |
| 2016/0031494 A1* | 2/2016 | Kinoshita | B62D 33/0617 |
| | | | 296/190.07 |
| 2016/0138673 A1* | 5/2016 | Hattori | B62D 33/0604 |
| | | | 248/634 |
| 2017/0241499 A1* | 8/2017 | Kosov | B62D 33/0604 |
| 2018/0201331 A1 | 7/2018 | Helm et al. | |
| 2019/0193795 A1* | 6/2019 | Young | B62D 27/04 |
| 2019/0382981 A1* | 12/2019 | Lee | E02F 9/16 |
| 2020/0055552 A1* | 2/2020 | Manternach | B62D 33/0604 |
| 2020/0070899 A1* | 3/2020 | Keller | B62D 27/04 |
| 2020/0070900 A1* | 3/2020 | Keller | B62D 27/04 |

* cited by examiner

OPERATOR STATION SUSPENSION ISOLATION SYSTEM

FIELD OF THE DISCLOSURE

The present disclosure relates to an operator station suspension system for a vehicle having a chassis and an operator station, and more particularly to an operator station suspension system that reduces noise and vibration between the chassis and the operator station.

BACKGROUND

Different types of vehicles, for example agricultural, construction and/or forestry vehicles, can operate on rough terrain or in other environments that produce a significant amount of noise and vibration for the operator. This noise and/or vibration can make it harder for the operator to select and move controls as desired, and generally make a less than desirable environment for the vehicle operator.

It would be desirable to have an operator station suspension system that includes mechanisms to damp the vibration and/or reduce the noise from the chassis of the vehicle to the operator station.

SUMMARY

An operator station suspension system is disclosed for a vehicle that includes a chassis and an operator station. The operator station suspension system includes a plurality of isolators, a butterfly crossbar and a plurality of station connection locations located on the butterfly crossbar. The butterfly crossbar includes a central crossbar that extends laterally between a left end and a right end, a left forward extending arm rigidly connected at or near the left end of the central crossbar and that extends in a forward direction, a right forward extending arm rigidly connected at or near the right end of the central crossbar and that extends in the forward direction, a left rearward extending arm rigidly connected at or near the left end of the central crossbar and that extends in a rearward direction, and a right rearward extending arm rigidly connected at or near the right end of the central crossbar and that extends in the rearward direction. The rearward direction is opposite the forward direction. The butterfly crossbar is configured to be coupled to the operator station at the station connection locations with one of the isolators located between the butterfly crossbar and the operator station at each of the station connection locations to reduce noise and vibration between the subframe structure and the operator station. The isolators can be made of rubber, or of a polymer material or of another material designed to reduce noise and vibration.

The operator station suspension system can also include a plurality of connection posts configured to couple the butterfly crossbar to the operator station, where one of the connection posts is located at each of the station connection locations. The isolators can have a ring-shape and be configured to fit over the connection posts to be positioned between the operator station and the butterfly crossbar at each of the station connection locations when the operator station is coupled to the subframe structure. The operator station suspension system can also include suspension components configured to couple the subframe structure to the chassis to enable movement of the subframe structure relative to the chassis. The suspension components can include shock dampers configured to couple the subframe structure to the chassis to enable vertical movement of the subframe structure relative to the chassis. The suspension components can include control linkages configured to couple the subframe structure to the chassis to enable pitch motion of the subframe structure relative to the chassis. The suspension components can include left and right stabilizer linkages and a torsion bar that are configured to couple the subframe structure to the chassis to enable roll motion of the subframe structure relative to the chassis.

The butterfly crossbar can be a single, unitary casting that includes the central crossbar, the left and right forward extending arms and the left and right rearward extending arms. The butterfly crossbar can have a plurality of hollowed-out openings. The central crossbar of the butterfly crossbar can be hollow. The central crossbar of the butterfly crossbar can be a first unitary piece; the left forward and rearward extending arms can be a second unitary piece, and the right forward and rearward extending arms can be a third unitary piece. Each of the left and right forward extending arms and each of the left and right rearward extending arms can include one of the station connection locations, and all four of the station connection locations can connect to the forward half of the operator station.

The operator station suspension system can also include a plurality of connection posts configured to couple the butterfly crossbar to the operator station, where one of the connection posts is located at each of the station connection locations, and where each of the left and right forward extending arms and each of the left and right rearward extending arms include one of the station connection locations.

The operator station suspension system can include left and right shock dampers that are configured to couple the butterfly crossbar to the chassis to enable vertical movement of the subframe structure relative to the chassis. The left shock damper can be coupled to the butterfly crossbar near the connection of the central crossbar with the left forward extending arm, and the right shock damper can be coupled to the butterfly crossbar near the connection of the central crossbar with the right forward extending arm.

The operator station suspension system can include left and right forward shock dampers and left and right rear shock dampers where the left and right forward shock dampers are configured to couple the butterfly crossbar to the chassis to enable vertical movement of the butterfly crossbar relative to the chassis, and the left and right rear shock dampers are configured to couple the subframe structure to the chassis to enable vertical movement of the subframe structure relative to the chassis. The left forward shock damper can have a proximal end connected to the butterfly crossbar near the connection of the central crossbar with the left forward extending arm, and a distal end connected to the chassis. The right forward shock damper can have a proximal end connected to the butterfly crossbar near the connection of the central crossbar with the right forward extending arm, and a distal end connected to the chassis. The left rear shock damper can have a proximal end connected to the operator station and a distal end coupled to the chassis. The right rear shock damper can have a proximal end coupled to the operator station and a distal end coupled to the chassis.

The operator station suspension system can include left and right control linkages that are configured to couple the butterfly crossbar to the chassis to enable pitch motion of the butterfly crossbar relative to the chassis. The left control linkage can be coupled to the left end of the central crossbar of the butterfly crossbar, and the right control linkage can be coupled to the right end of the central crossbar of the butterfly crossbar.

The operator station suspension system can include left and right lower arm casings, and left and right control linkages configured to couple the butterfly crossbar to the chassis to enable pitch motion of the butterfly crossbar relative to the chassis. The left lower arm casing can be rigidly connected to the central crossbar of the butterfly crossbar near the left end of the central crossbar. The right lower arm casing can be rigidly connected to the central crossbar of the butterfly crossbar near the right end of the central crossbar. The left control linkage can have a proximal end hingedly connected to the left lower arm casing and a distal end connected to the chassis. The right control linkage can have a proximal end hingedly connected to the right lower arm casing and a distal end connected to the chassis.

The operator station suspension system can include left and right stabilizer linkages and a torsion bar configured to couple the butterfly crossbar to the chassis to enable roll motion of the butterfly crossbar relative to the chassis. The left stabilizer linkage can be coupled to the left end of the central crossbar of the butterfly crossbar. The right stabilizer linkage can be coupled to the right end of the central crossbar of the butterfly crossbar. The torsion bar can extend laterally between the left and right stabilizer linkages adjacent to the central crossbar of the butterfly crossbar. The left stabilizer linkage can have a proximal end hingedly connected to the left end of the central crossbar of the butterfly crossbar and a distal end connected to the chassis. The right stabilizer linkage can have a proximal end hingedly connected to the right end of the central crossbar of the butterfly crossbar and a distal end connected to the chassis. The torsion bar can have a left end rigidly connected to the left stabilizer linkage near the proximal end of the left stabilizer linkage, and a right end rigidly connected to the right stabilizer linkage near the proximal end of the right stabilizer linkage, such that the torsion bar extends laterally between the left and right stabilizer linkages adjacent to the central crossbar of the butterfly crossbar.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
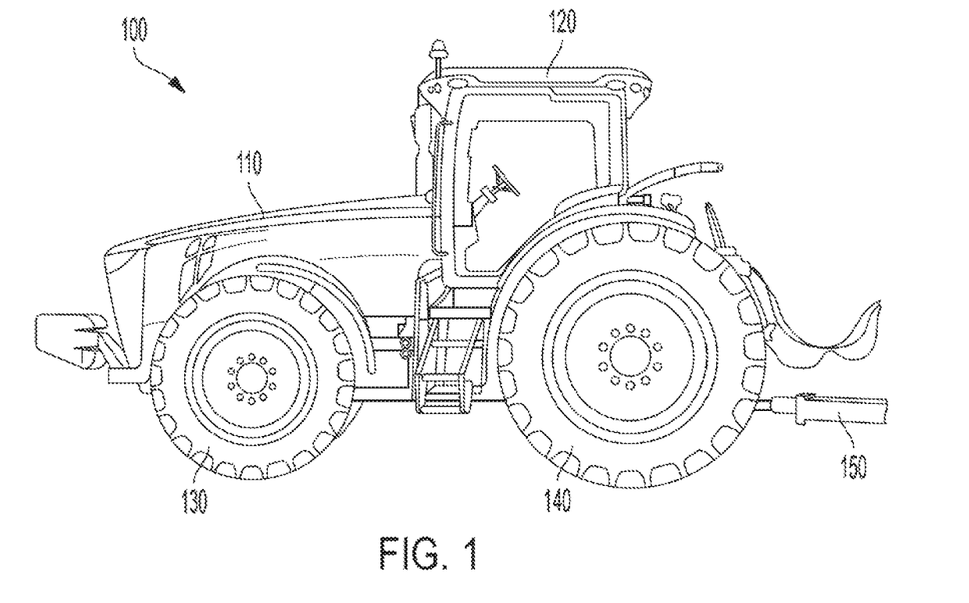
FIG. 1 illustrates an exemplary embodiment of a vehicle that includes an operator cab connected to an operator station suspension system.

FIG. 1 illustrates an exemplary embodiment of a tractor 100 that includes an engine compartment 110 that holds an engine, an operator cab 120, front wheels 130, rear wheels 140 and an implement connector 150. The front and rear wheels 130, 140 support the engine compartment 110 and operator cab 120 above the ground. In alternative tractor embodiments, tracks can be used instead of wheels. An implement can be coupled to the implement connector 150 to be pulled and/or controlled by the tractor 100. The operator cab 120 includes controls for an operator to control the tractor 100, including the engine, wheels 130, 140 and other components of the tractor and can include controls for the operator to control an implement coupled to the implement connector 150. The engine provides power to turn the wheels 130, 140 to propel the tractor 100. At least the front wheels 130 can be steerable to steer the tractor 100, and alternatively both the front and rear wheels 130, 140 can be steerable to steer the tractor 100. The operator cab 120 provides the operator with a clear view of the area being worked by the tractor 100.

Figure 2:
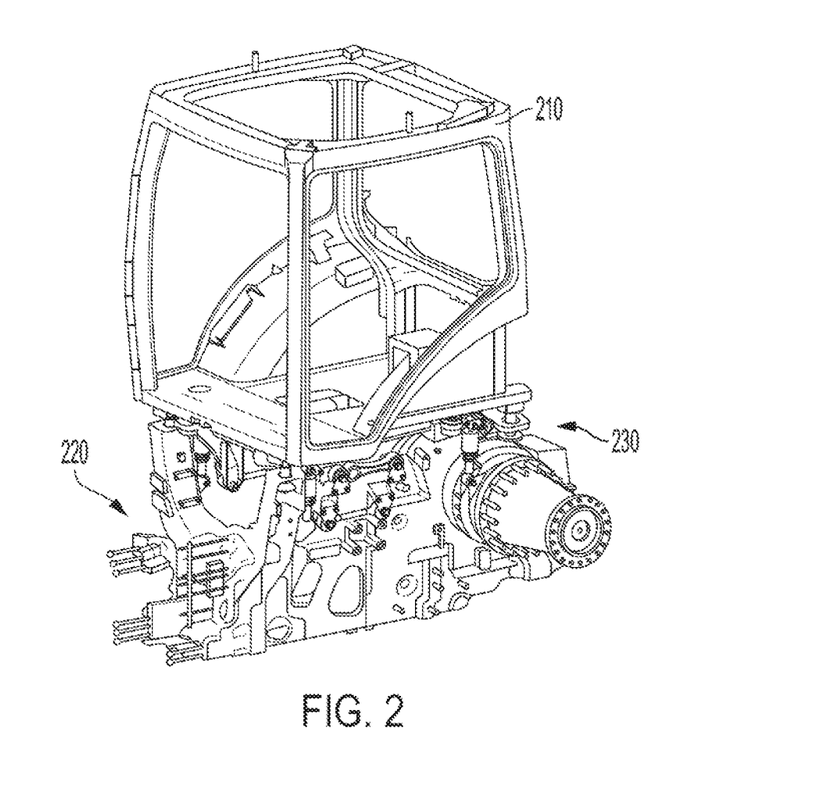
FIG. 2 illustrates an exemplary view of an operator cab frame coupled to a vehicle chassis by an operator station suspension system.
Figure 3:
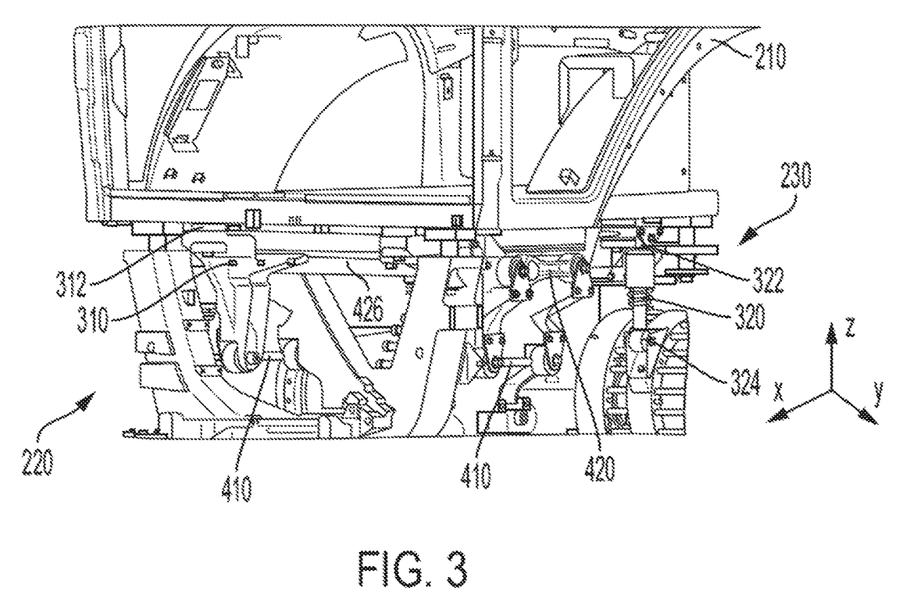
FIG. 3 illustrates another exemplary view of an operator cab frame coupled to a vehicle chassis by an operator station suspension system.

FIGS. 2 and 3 illustrate views of an operator station frame 210 coupled to a tractor chassis 220 of the tractor 100 with the outer body and wheels removed for clarity. The operator cab frame 210 is coupled to the chassis 220 by an operator station suspension system 230. FIG. 3 also shows x, y and z axes which will be referred to in this description. In general, the z-axis is in the vertical direction representing up-down movement; the x-axis is in a horizontal direction representing forward-reverse direction movement; and the y-axis is in a horizontal direction representing lateral or right-left direction movement. The x, y and z axes are perpendicular to one another.

Figure 4:
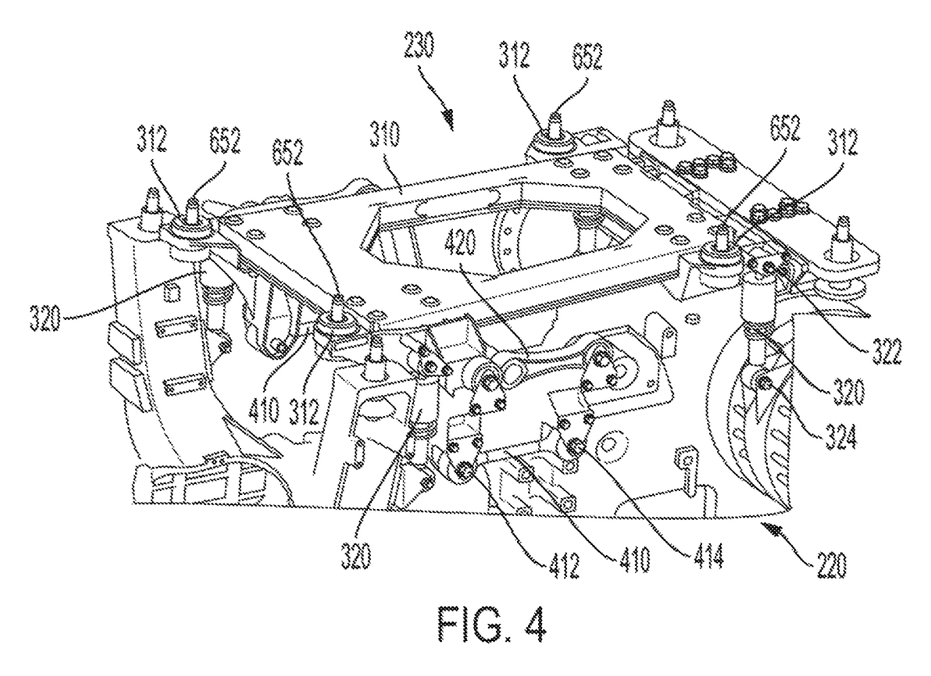
FIG. 4 illustrates an exemplary view of the operator station suspension system coupled to the vehicle chassis with the operator cab frame removed for clarity.
Figure 5:
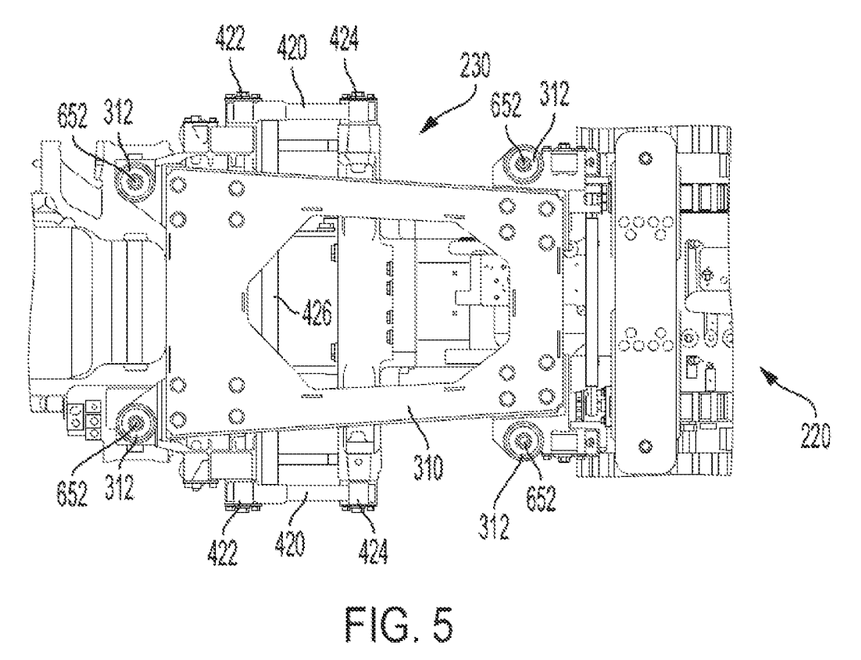
FIG. 5 illustrates a top view of the operator station suspension system coupled to the vehicle chassis with the operator cab frame removed.

FIGS. 4 and 5 illustrate the operator station suspension system 230 and the tractor chassis 220 with the operator station frame 210 removed to more clearly show the operator station suspension system 230. The operator station suspension system 230 includes a subframe structure 310, shock dampers 320, control linkages 410, and stabilizer linkages 420.

The operator station frame 210 is rigidly attached to the subframe structure 310 at multiple station connection locations. One of the noise and vibration (NV) isolators 312 is positioned between the operator station frame 210 and the subframe structure 310 at each station connection location to reduce noise and vibration passing from the subframe structure 310 to the operator station frame 210.

Each of the shock dampers 320 has a proximal end 322 connected to the subframe structure 310 and a distal end 324 connected to the tractor chassis 220. The exemplary embodiment shows four shock dampers 320 near the four corners of the subframe structure 310. The shock dampers 320 can extend and retract in the vertical or z-direction which enables the subframe structure 310 and operator station frame 210 to move in the vertical or z-direction relative to the tractor chassis 220.

Each of the control linkages 410 has a proximal end 412 hingedly connected to the subframe structure 310 and a distal end 414 hingedly connected to the tractor chassis 220. The exemplary embodiment shows two control linkages 410, one connecting to the right side and the other connecting to the left side of the subframe structure 310 to the tractor chassis 220. The control linkages 410 can rotate about the connections at the tractor chassis 220 and the subframe structure 310 which provides pitch stability to the subframe structure 310 and operator station frame 210 to control forward and backward pitch motion about the y-axis relative to the tractor chassis 220.

Each of the stabilizer linkages 420 has a proximal end 422 hingedly connected to the subframe structure 310 and a distal end 424 hingedly connected to the tractor chassis 220. The exemplary embodiment shows two stabilizer linkages 420, one connecting to the right side and the other connecting to the left side of the subframe structure 310 to the tractor chassis 220. The stabilizer linkage also includes a torsion bar 426 that rigidly connects the right side stabilizer linkage 420 and the left side stabilizer linkage 420. The stabilizer linkages 420 and torsion bar 426 provide roll stiffness to the subframe structure 310 and operator station frame 210 to control right-to-left roll motion about the x-axis relative to the tractor chassis 220.

Figure 6:
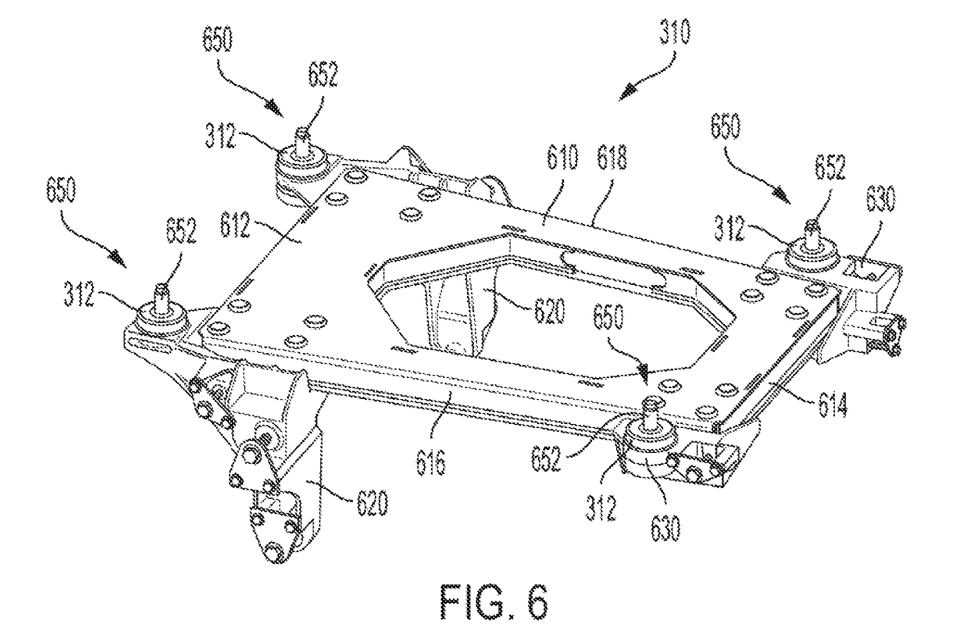
FIG. 6 illustrates an exemplary embodiment of a sub-frame structure of an operator station suspension system with noise and vibration isolators at the station connection locations where the operator station suspension system is coupled to the operator cab frame.

In the exemplary embodiment, the subframe structure 310, shown separately in FIG. 6, includes a rigid quadrilateral body 610, left and right forward arms 620 and left and right rearward arms 630. The quadrilateral body 610 includes a forward side 612, a rearward side 614, a left side 616 and a right side 618. The forward arms 620 and rearward arms 630 are rigidly connected to the quadrilateral body 610 to form a rigid subframe structure 310. The quadrilateral body 610, forward arms 620 and rearward arms 630 can be multiple components bolted together or a single, unitary casting. The left forward arm 620 is connected at or near where the forward and left sides 612, 616 of the quadrilateral body 610 meet. The right forward arm 620 is connected at or near where the forward and right sides 612, 618 of the quadrilateral body 610 meet. The left rearward arm 630 is connected at or near where the rearward and left sides 614, 616 of the quadrilateral body 610 meet. The right rearward arm 630 is connected at or near where the rearward and right sides 614, 618 of the quadrilateral body 610 meet.

The proximal end 412 of the right-side control linkage 410, and the proximal end 422 of the right-side stabilizer linkage 420 are connected to the right forward arm 620 of the subframe structure 310. The proximal end 412 of the left-side control linkage 410, and the proximal end 422 of the left-side stabilizer linkage 420 are connected to the left forward arm 620 of the subframe structure 310. The proximal ends 322 of the shock dampers 320 can be connected to each of the forward arms 620 and rearward arms 630 of the subframe structure 310.

The subframe structure 310 is rigidly attached to the operator station frame 210 at multiple station connection locations 650. In the exemplary embodiment, there are four station connection locations 650 where the subframe structure 310 is attached to the operator station frame 210, and each of the station connection locations 650 includes a connection post 652. The subframe structure 310 is configured to connect to the operator station frame 210 using the connection posts 652. One of the noise and vibration (NV) isolators 312 is positioned between the operator station frame 210 and the subframe structure 310 at each of the station connection locations 650. The NV isolators 312 can have a ring-shape and fit over the connection posts 652 to be located between the operator station frame 210 and the subframe structure 310 at each of the station connection locations 650. The NV isolators 312 can be made of rubber, foam, polymer or other materials to reduce and/or isolate noise and vibration of the tractor chassis 220 and operator station suspension system 230 before passing to the operator station frame 210. Thus, the NV isolators 312 create a damping or isolation layer between the subframe structure 310 and the operator station frame 210. The NV isolators 312 can be designed to reduce or isolate certain target frequencies from passing between the subframe structure 310 and the operator station frame 210.

Figure 7:
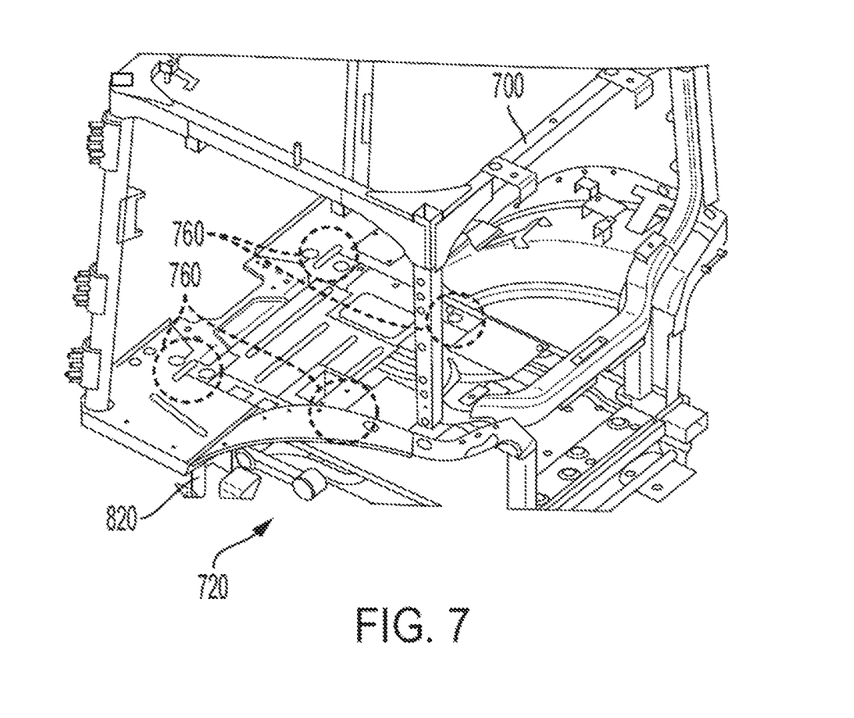
FIG. 7 illustrates a perspective view of an operator station frame and an alternative embodiment of an operator station suspension isolation system.
Figure 8:
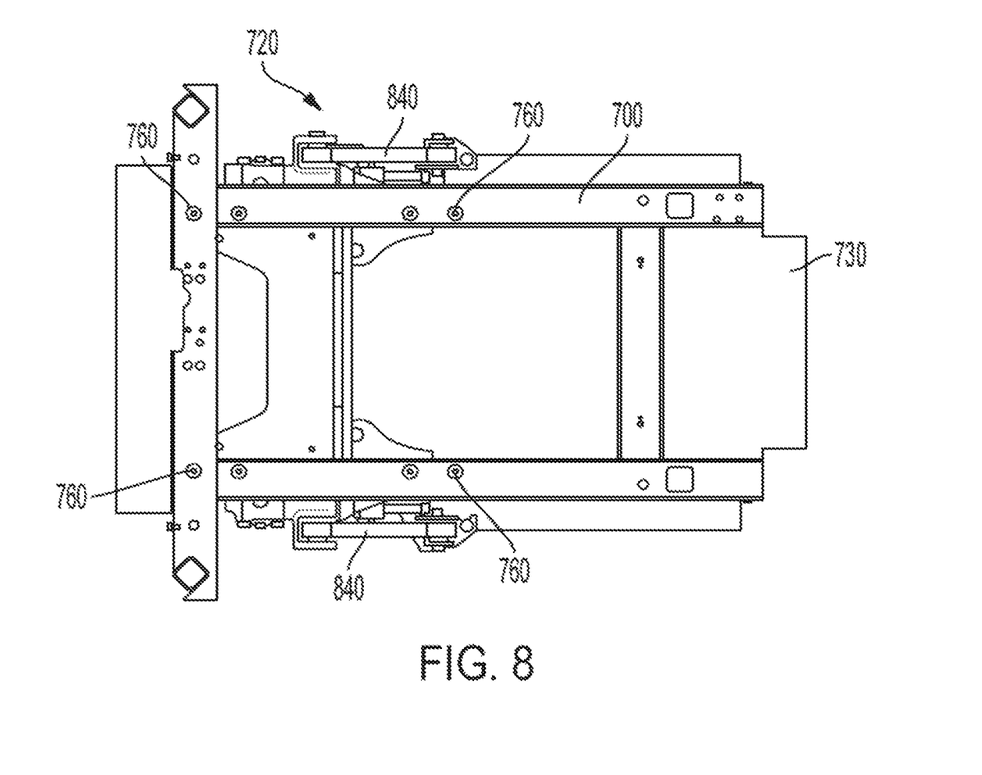
FIG. 8 illustrates a top view of the operator station frame and the alternative embodiment of the operator station suspension isolation system.
Figure 9:
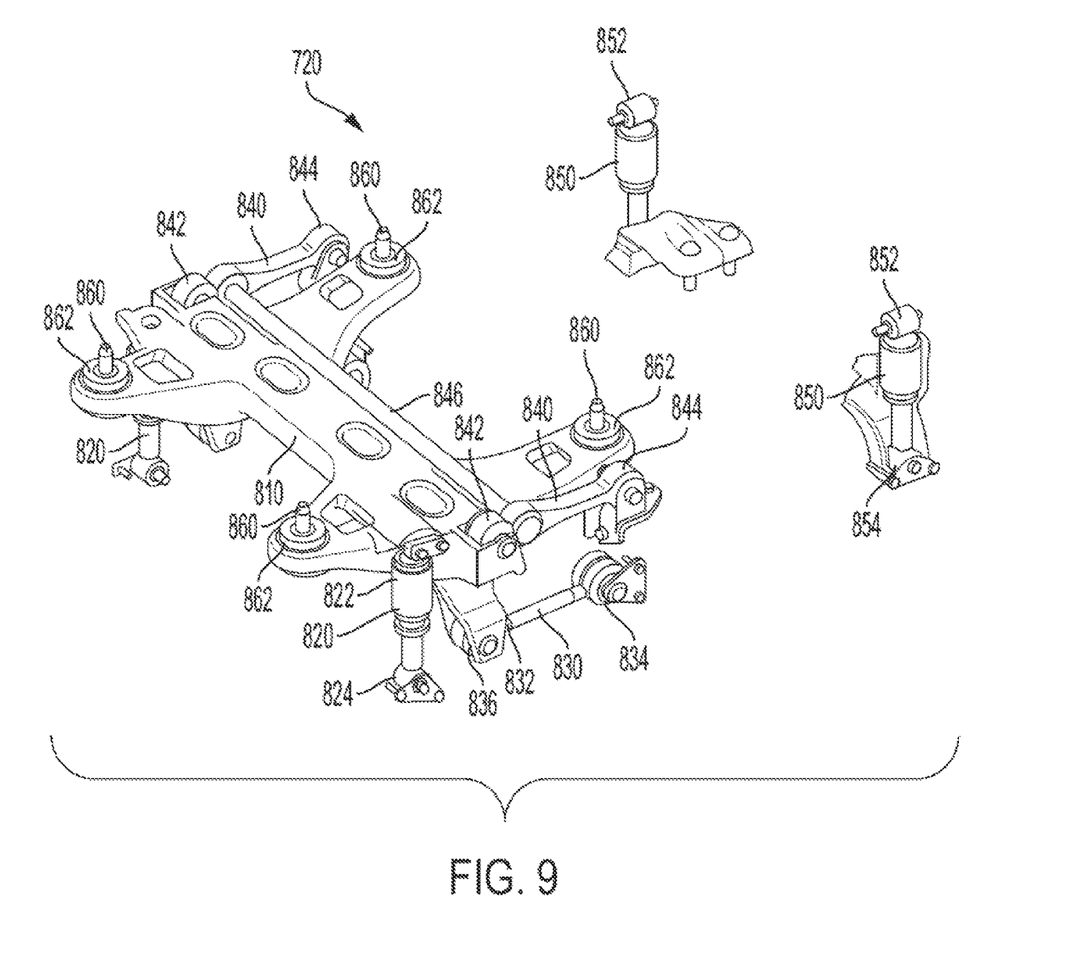
FIG. 9 illustrates the alternative operator station suspension system with the operator station frame removed to more clearly show the underlying operator station suspension system.
Figure 10:
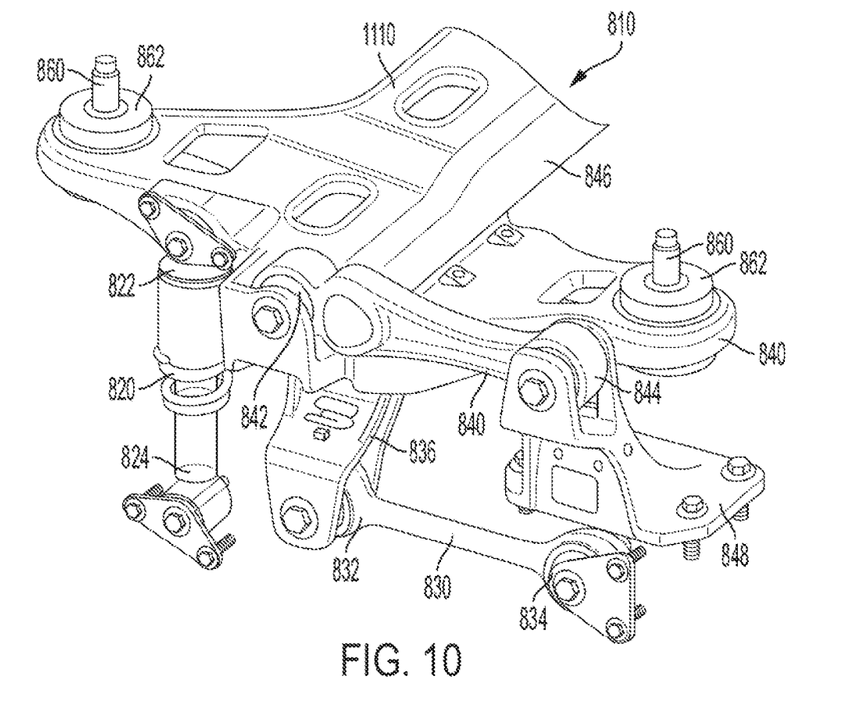
FIG. 10 illustrates a close-up view of left-side of the butterfly crossbar and the components of the operator station suspension system connected to the butterfly crossbar.
Figure 11:
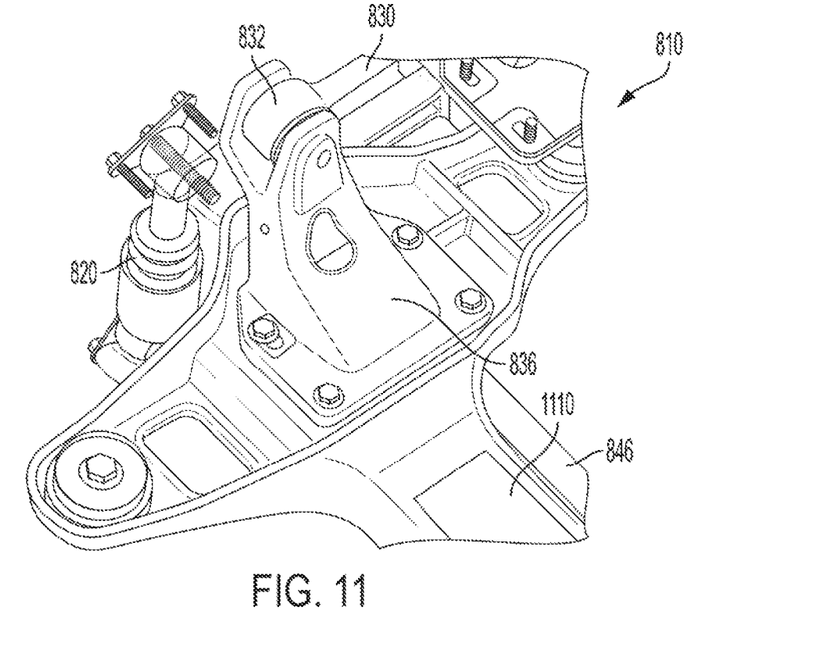
FIG. 11 illustrates a close-up, bottom-up view of the connection between the left-side of the butterfly crossbar and the left-side control linkage.

FIG. 7 illustrates a perspective view and FIG. 8 illustrates a top view of an operator station frame 700 and an alternative embodiment of an operator station suspension isolation system 720 that can be coupled to a vehicle chassis 730 of the tractor 100. FIG. 9 illustrates the operator station suspension system 720 with the operator station frame 700 removed to more clearly show the underlying operator station suspension system 720. The operator station suspension system 720 includes a butterfly crossbar 810, forward shock dampers 820, rear shock dampers 850, control linkages 830, and stabilizer linkages 840. FIG. 10 illustrates a close-up view of left-side of the butterfly crossbar 810 and the components of the operator station suspension system 720 connected to the butterfly crossbar 810. FIG. 11 illustrates a close-up, bottom-up view of the connection between the left-side of the butterfly crossbar 810 and the left-side control linkage 830.

FIG. 9 also shows x, y and z axes which will be referred to in this description. In general, the z-axis is in the vertical direction representing up-down movement; the x-axis is in a horizontal direction representing forward-reverse direction movement; and the y-axis is in a horizontal direction representing lateral or right-left direction movement. The x, y and z axes are perpendicular to one another.

The exemplary crossbar 810, referred to herein as the butterfly crossbar 810, can have a generally H-shape or "butterfly-shape" with a central body and arms or wings extending in opposite directions from the central body near opposite ends of the central body. The arms or wings can be generally perpendicular to the central body. The exemplary crossbar 810 is described in greater detail below with reference to FIGS. 12 and 13.

Four crossbar connectors 860 couple the butterfly crossbar 810 to the operator station frame 700. FIGS. 7 and 8 illustrate four connection locations 760 where the crossbar connectors 860 couple the butterfly crossbar 810 to the operator station frame 700. A noise and vibration (NV) isolator 862 is positioned on each of the crossbar connectors 860 between the butterfly crossbar 810 and the operator station frame 700 at each of the connection locations 760 to reduce noise and vibration passing from the butterfly crossbar 810 and operator station suspension system 720 to the operator station frame 700. Note that all four of the connection locations 760 are in the forward half of the operator station frame 700. The butterfly crossbar 810 acts as a narrowed subframe structure supporting the majority of the mass of the operator station frame 700.

Each of the forward shock dampers 820 has a proximal end 822 and a distal end 824. The proximal ends 822 are connected to the butterfly crossbar 810. The distal ends 824 are rigidly connected to the vehicle chassis 730. Each of the rear shock dampers 850 has a proximal end 852 and a distal end 854. The proximal ends 852 are connected to the operator station frame 700, and the distal ends 854 are rigidly connected to the vehicle chassis 730. The exemplary embodiment shows left and right forward shock dampers 820 near the front of the operator station frame 700, and left and right rear shock dampers 850 near the rear of the operator station frame 700. The shock dampers 820, 850 can extend and retract in the vertical or z-direction which enables the operator station frame 700 to move in the vertical or z-direction relative to the vehicle chassis 730.

Each of the control linkages 830 has a proximal end 832 and a distal end 834. The proximal end 832 is hingedly connected to a lower-arm casting 836 that is rigidly connected to the butterfly crossbar 810 (best shown in FIG. 11). The distal end 834 is hingedly connected to the vehicle chassis 730. The exemplary embodiment shows two control linkages 830, one connecting to the right side and the other connecting to the left side of the butterfly crossbar 810 to the vehicle chassis 730. The control linkages 830 can rotate about the connections at the vehicle chassis 730 and the lower-arm casting 836 which provides pitch stability to the butterfly crossbar 810 to control forward and backward pitch motion about the y-axis of the operator station frame 700 relative to the vehicle chassis 730.

Each of the stabilizer linkages 840 has a proximal end 842 and a distal end 844. The proximal end 842 is hingedly connected to the butterfly crossbar 810. The distal end 844 is hingedly connected to a stabilizer casting 848 that is rigidly connected to the vehicle chassis 730. The exemplary embodiment shows two stabilizer linkages 840, one connecting to the right side and the other connecting to the left side of the butterfly crossbar 810 to the vehicle chassis 730. The stabilizer linkage also includes a torsion bar 846 that rigidly connects the right side stabilizer linkage 840 and the left side stabilizer linkage 840. The torsion bar 846 can be connected near the proximal ends 842 of the right and left stabilizer linkages 840 to position the torsion bar 846 adjacent to the crossbar 1110 of the butterfly crossbar 810. The stabilizer linkages 840 and torsion bar 846 provide roll stiffness to the butterfly crossbar 810 to control right-to-left roll motion about the x-axis of the operator station frame 700 relative to the vehicle chassis 730.

Figure 12:
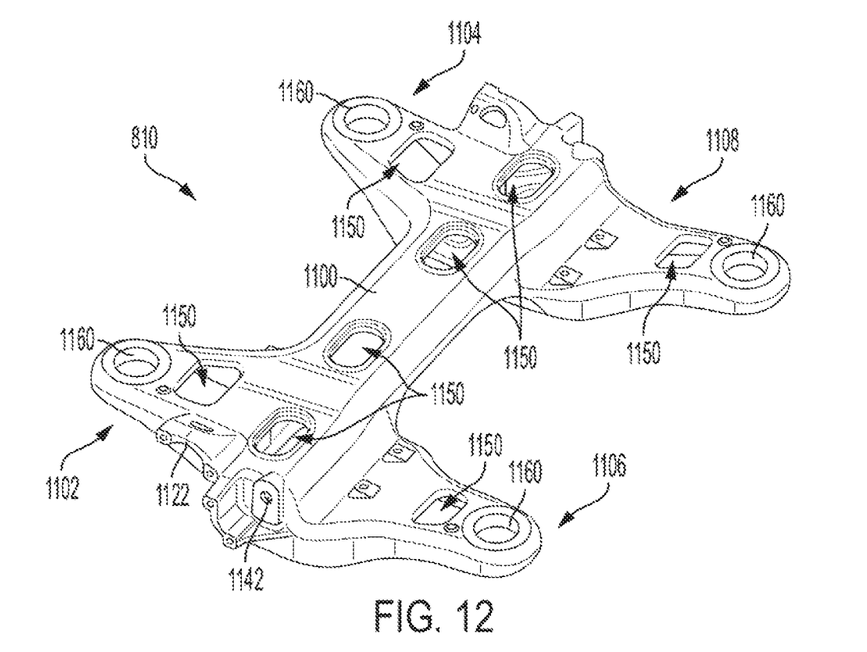
FIG. 12 illustrates a top view of an exemplary butterfly crossbar.
Figure 13:
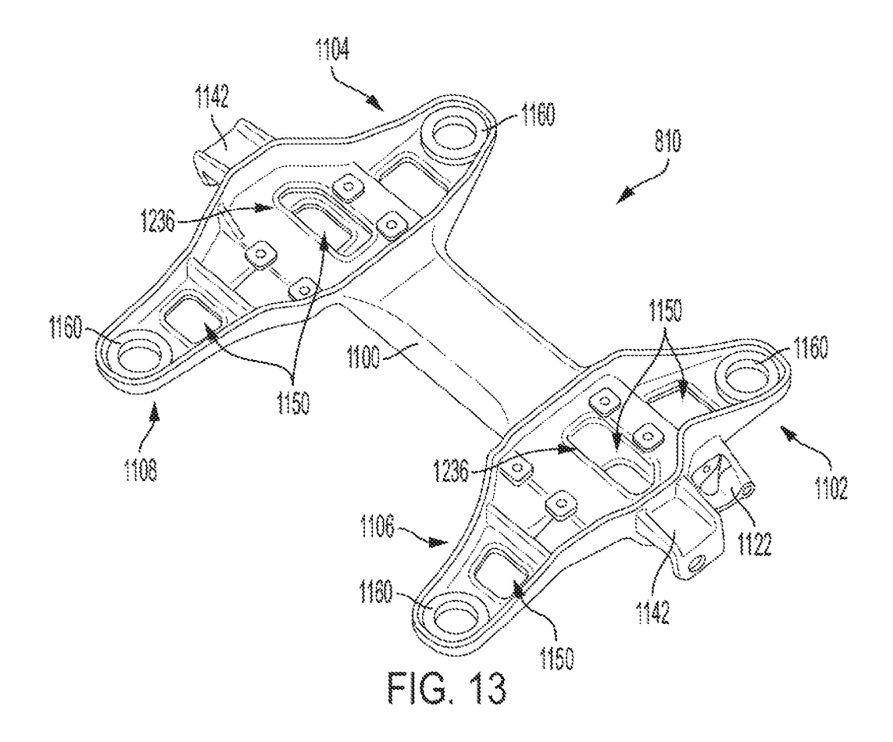
FIG. 13 illustrates a bottom view of the exemplary butterfly crossbar.

FIG. 12 illustrates a top view of an exemplary butterfly crossbar 810 and FIG. 13 illustrates a bottom view of the exemplary butterfly crossbar 810. The butterfly crossbar 810 includes a central crossbar 1100 that extends laterally across the vehicle, left and right forward-extending arms 1102, 1104 and left and right rearward extending arms 1106, 1108. The central crossbar 1100, forward-extending arms 1102, 1104, and rearward extending arms 1106, 1108 can be a single, unitary casting, or the can be multiple pieces rigidly joined or bolted together. The central crossbar 1100, forward-extending arms 1102, 1104, and rearward extending arms 1106, 1108 can each be solid, or hollow, or can have a ridge-structure to provide the desired amount of flexibility and rigidity. In addition, the central crossbar 1100, forward-extending arms 1102, 1104, and rearward extending arms 1106, 1108 can each have hollowed-out openings 1150 to provide additional flexibility and rigidity. The flexibility and rigidity trade-offs provided by the structure of the central crossbar 1100 and arms 1102-1108, and the hollowed-out openings 1150 can be used to tune the operator station suspension system 720 to help resolve noise and ride-quality issues for the vehicle 100.

Each of the forward-extending arms 1102, 1104, and rearward extending arms 1106, 1108 includes a connector position 1160 where one of the crossbar connectors 860 will be attached. The lengths of the arms 1102-1108 and locations of the connector positions 1160 on the arms 1102-1108 can be used for distribution of mass on the butterfly crossbar 810 which can aid in noise and vibration reduction.

The right and left ends of the central crossbar 1100 include stabilizer connections 1142 where the proximal ends 842 of the right and left stabilizer linkages 840 are connected. On the outside of the connections of the forward-extending arms 1102, 1104 with the central crossbar 1100 are shock damper connections 1122 where the proximal ends 822 of the right and left forward shock dampers 820 are connected. FIG. 13 also shows lower-arm connections 1236 where the lower-arm casting 836 are rigidly connected to the butterfly crossbar 810.

The butterfly crossbar 810 acts as the subframe structure and supports the mass of the operator station frame 700 with all of the connection locations 760 being in the forward half of the operator station frame 700. This eliminates the need for an elongated subframe structure that extends substantially the full-length of the operator station frame 700, and due to the reduced space provides more room beneath the operator station frame 700 for placement of other vehicle systems that pass between the operator station frame 700 and the rest of the vehicle 100.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. An operator station suspension system for a vehicle that includes a chassis and an operator station, the operator station suspension system comprising:
    a plurality of isolators; and
    a butterfly crossbar comprising:
        a central crossbar that extends laterally between a left end and a right end;

a left forward extending arm rigidly connected at or near the left end of the central crossbar and that extends in a forward direction;

a right forward extending arm rigidly connected at or near the right end of the central crossbar and that extends in the forward direction;

a left rearward extending arm rigidly connected at or near the left end of the central crossbar and that extends in a rearward direction, the rearward direction being opposite the forward direction; and a right rearward extending arm rigidly connected at or near the right end of the central crossbar and that extends in the rearward direction;

a plurality of station connection locations located on the butterfly crossbar;

wherein the butterfly crossbar is configured to be coupled to the operator station at the plurality of station connection locations with one of the plurality of isolators located between the butterfly crossbar and the operator station at each of the plurality of station connection locations to reduce noise and vibration between the subframe structure and the operator station.

2. The operator station suspension system of claim 1, wherein the plurality of isolators are made of rubber.

3. The operator station suspension system of claim 1, wherein the plurality of isolators are made of a polymer material designed to reduce noise and vibration.

4. The operator station suspension system of claim 1, further comprising a plurality of connection posts configured to couple the butterfly crossbar to the operator station, one of the plurality of connection posts located at each of the plurality of station connection locations; and wherein each of the plurality of isolators has a ring-shape and is configured to fit over one of the plurality of connection posts to be positioned between the operator station and the butterfly crossbar at each of the station connection locations when the operator station is coupled to the subframe structure.

5. The operator station suspension system of claim 4, further comprising suspension components configured to couple the subframe structure to the chassis to enable movement of the subframe structure relative to the chassis.

6. The operator station suspension system of claim 5, wherein the suspension components comprise a plurality of shock dampers configured to couple the subframe structure to the chassis to enable vertical movement of the subframe structure relative to the chassis.

7. The operator station suspension system of claim 6, wherein the suspension components further comprise a plurality of control linkages configured to couple the subframe structure to the chassis to enable pitch motion of the subframe structure relative to the chassis.

8. The operator station suspension system of claim 7, wherein the suspension components further comprise a left stabilizer linkage, a right stabilizer linkage and a torsion bar that rigidly connects the left and right stabilizer linkages, wherein the left and right stabilizer linkages and the torsion bar are configured to couple the subframe structure to the chassis to enable roll motion of the subframe structure relative to the chassis.

9. The operator station suspension system of claim 1, wherein the butterfly crossbar is a single, unitary casting that includes the central crossbar, the left and right forward extending arms and the left and right rearward extending arms.

10. The operator station suspension system of claim 1, wherein the butterfly crossbar has a plurality of hollowed-out openings.

11. The operator station suspension system of claim 1, wherein the central crossbar of the butterfly crossbar is hollow.

12. The operator station suspension system of claim 1, wherein the central crossbar of the butterfly crossbar is a first unitary piece; the left forward and rearward extending arms are a second unitary piece, and the right forward and rearward extending arms are a third unitary piece.

13. The operator station suspension system of claim 1, wherein each of the left and right forward extending arms and each of the left and right rearward extending arms include one of the plurality of station connection locations, and all four of the plurality of station connection locations connect to the forward half of the operator station.

14. The operator station suspension system of claim 1, further comprising a plurality of connection posts configured to couple the butterfly crossbar to the operator station, one of the plurality of connection posts located at each of the plurality of station connection locations;

wherein each of the left and right forward extending arms and each of the left and right rearward extending arms include one of the plurality of station connection locations; and wherein each of the plurality of isolators has a ring-shape and is configured to fit over one of the plurality of connection posts to be positioned between the operator station and the butterfly crossbar at each of the station connection locations when the operator station is coupled to the subframe structure.

15. The operator station suspension system of claim 14, further comprising:

a left shock damper coupled to the butterfly crossbar near the connection of the central crossbar with the left forward extending arm; and a right shock damper coupled to the butterfly crossbar near the connection of the central crossbar with the right forward extending arm;

wherein the left and right shock dampers are configured to couple the butterfly crossbar to the chassis to enable vertical movement of the subframe structure relative to the chassis.

16. The operator station suspension system of claim 14, further comprising:

a left forward shock damper with a proximal end connected to the butterfly crossbar near the connection of the central crossbar with the left forward extending arm and a distal end connected to the chassis;

a right forward shock damper with a proximal end connected to the butterfly crossbar near the connection of the central crossbar with the right forward extending arm and a distal end connected to the chassis;

a left rear shock damper with a proximal end connected to the operator station and a distal end coupled to the chassis; and a right rear shock damper with a proximal end coupled to the operator station and a distal end coupled to the chassis;

wherein the left and right forward shock dampers are configured to couple the butterfly crossbar to the chassis to enable vertical movement of the butterfly crossbar relative to the chassis, and the left and right rear shock dampers are configured to couple the subframe structure to the chassis to enable vertical movement of the subframe structure relative to the chassis.

17. The operator station suspension system of claim 14, further comprising:
- a left control linkage coupled to the left end of the central crossbar of the butterfly crossbar; and
- a right control linkage coupled to the right end of the central crossbar of the butterfly crossbar;
- wherein the left and right control linkages are configured to couple the butterfly crossbar to the chassis to enable pitch motion of the butterfly crossbar relative to the chassis.

18. The operator station suspension system of claim 14, further comprising:
- a left lower arm casing rigidly connected to the central crossbar of the butterfly crossbar near the left end of the central crossbar;
- a right lower arm casing rigidly connected to the central crossbar of the butterfly crossbar near the right end of the central crossbar;
- a left control linkage with a proximal end hingedly connected to the left lower arm casing and a distal end connected to the chassis; and
- a right control linkage with a proximal end hingedly connected to the right lower arm casing and a distal end connected to the chassis;
- wherein the left and right control linkages are configured to couple the butterfly crossbar to the chassis to enable pitch motion of the butterfly crossbar relative to the chassis.

19. The operator station suspension system of claim 14, further comprising:
- a left stabilizer linkage coupled to the left end of the central crossbar of the butterfly crossbar;
- a right stabilizer linkage coupled to the right end of the central crossbar of the butterfly crossbar; and
- a torsion bar that extends laterally between the left and right stabilizer linkages adjacent to the central crossbar of the butterfly crossbar;
- wherein the left and right stabilizer linkages and torsion bar are configured to couple the butterfly crossbar to the chassis to enable roll motion of the butterfly crossbar relative to the chassis.

20. The operator station suspension system of claim 14, further comprising:
- a left stabilizer linkage with a proximal end hingedly connected to the left end of the central crossbar of the butterfly crossbar and a distal end connected to the chassis;
- a right stabilizer linkage with a proximal end hingedly connected to the right end of the central crossbar of the butterfly crossbar and a distal end connected to the chassis; and
- a torsion bar with a left end rigidly connected to the left stabilizer linkage near the proximal end of the left stabilizer linkage and a right end rigidly connected to the right stabilizer linkage near the proximal end of the right stabilizer linkage such that the torsion bar extends laterally between the left and right stabilizer linkages adjacent to the central crossbar of the butterfly crossbar;
- wherein the left and right stabilizer linkages and torsion bar are configured to couple the butterfly crossbar to the chassis to enable roll motion of the butterfly crossbar relative to the chassis.

* * * * *